UNITED STATES PATENT OFFICE.

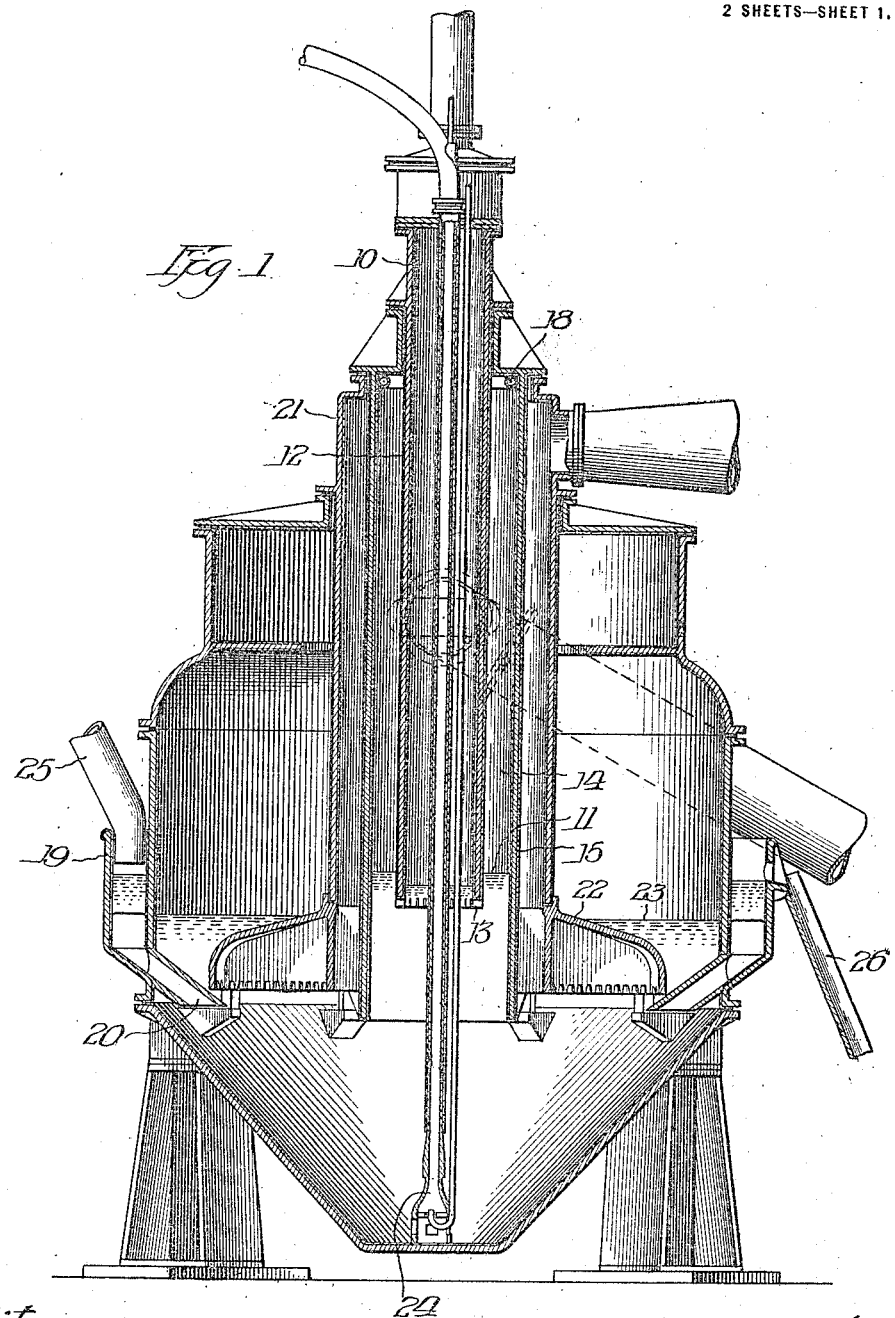

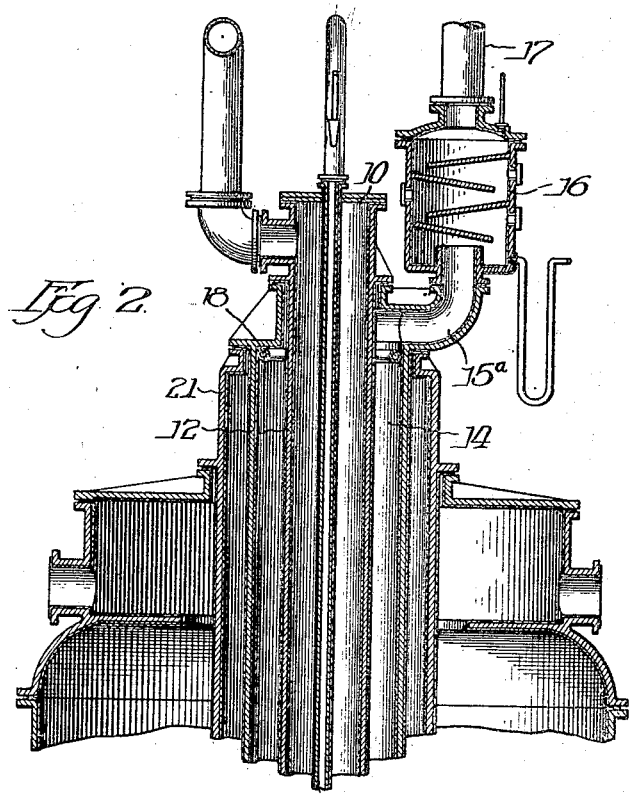
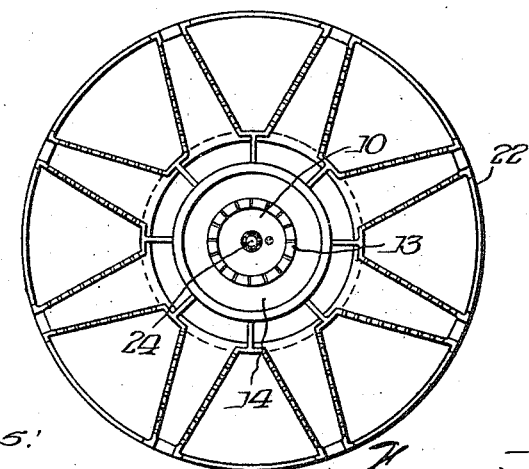

FREDERICK TSCHUDY, OF FAIRFIELD, ALABAMA.

SATURATING APPARATUS.

1,155,386. Specification of Letters Patent. Patented Oct. 5, 1915.

Application filed September 21, 1914. Serial No. 862,835.

*To all whom it may concern:*

Be it known that I, FREDERICK TSCHUDY, a citizen of the United States, and resident of Fairfield, in the county of Jefferson and State of Alabama, have invented certain new and useful Improvements in Saturating Apparatus, of which the following is a specification.

My invention relates to a combined gas and vapor saturating apparatus in which may be carried on the process by which gas and vapors of different composition and origin are separately passed at different temperatures into one and the same saturating bath, which bath is maintained at differential temperatures and levels and to the separate withdrawal of the gases and waste, the first under pressure and the second under suction. The diffusion of the waste heat of the high temperature gas is utilized to produce all the heat required by the low temperature bath.

In the process of manufacture of ammonium sulfate from gases produced by the distillation of fuel, the gas evolved from the fuel carries off most of the tar and all of the adhesive and native moisture. If the character of the coal charged requires that it must be washed, the liberated adhesive moisture plays a considerable factor in the condensation of the gases evolved. Good practice requires that the gases should be cooled to a temperature between 75 and 85° F., at which temperature practically all the tar and nearly all the aqueous vapors are condensed from the gas. The gas is then treated by the well known process of passing it through a bath of acid which, for reason of proper operation and economy, must be kept at a certain constant temperature. The lower this temperature, within certain limits, is maintained, the better the results obtained, not only as to the size of the crystals of the salt produced, but more so as to the amount of water carried in suspension by the gas leaving the bath, at the temperature attained by reaction of the acid, which water should be equal in amount to the water contained in suspension in a gas which has been previously cooled to about 75 degrees F. the water contained in the acid used in the process and the water used for washing the sulfate after extraction from the bath, but minus the surplus water carried to the saturator by the high temperature ammoniacal vapor. The water decanted from the condensate deposited in the system and coolers contains a certain percentage of free and fixed ammonia, originating from the coal carbonized. The amount of water of condensation depends entirely on the moisture of the coal charged. This water of condensation, called weak liquor, is treated in the usual manner by treating in special stills and the vapors are treated similarly to the gas by passing them into an acid bath. From the above it is clearly noted that the gases are treated by cooling while the ammoniacal vapors are derived from the weak liquor by distillation. Consequently, the gas is of a low temperature while the ammoniacal vapors are of a temperature close to the point of saturation of steam, if the still is worked at low pressure and over this point if the distillation takes place at high pressure. Furthermore, the gas must be subject to pressure produced by mechanical means, such as exhausters or blowers, while the ammoniacal vapors are able to move by the pressure produced by their initial temperature tension. It is further known that the ammoniacal vapors contain certain amounts of sulfureted hydrogen, carbonic acid, hydro-cyanic acid and also traces of hydrochloric acid, besides a large amount of aqueous vapors in suspension. This combination, known as noxious gases, must be liberated and not mixed with the gases as they contaminate the same, lower its heating value and often act detrimentally on the pipe system through which the gases must pass. In order to liberate these noxious gases, it must appear as evident that they must be carried off with the surplus moisture. This requires that the temperature of the bath at the point of immersion of the vapors must be of a temperature equal to or higher than that of the vapors. According to this, it would therefore become necessary to keep the bath at a high temperature in the processes where both gas and ammoniacal vapors are immersed simultaneously into the same acid bath. If this be not done the aqueous vapors must condense to a degree permitted by the lower temperature of the bath which must result in the dilution of said bath.

The object of the present invention is to provide a saturating apparatus designed to carry on simultaneously two processes of saturation in one and the same bath, each process working under its particular requirements as to temperature and pressure for the most economical production in which the heat attained by one part of the bath, due to a hot process being applied, is utilized to keep the temperature of the rest of the bath at such a degree that a cold process saturation is a possibility.

A further object of the invention is to maintain the desired temperature by making use of radiating waste heat in one part, while in the other part waste heat is utilized to prevent radiation.

The invention will be more readily understood by reference to the accompanying drawings, wherein, Figure 1 is a vertical section through the saturator constructed in accordance with my invention; Fig. 2 is a section taken at right angles to that of Fig. 1, showing the top portion of the saturator, and, Fig. 3 is a bottom plan view of the cracker pipe.

Referring more particularly to the drawings it will be seen that a vertical section is shown through the saturator, representing the usual type of vessel used for saturation, either for gas or ammoniacal vapors or both, and is of circular cross section. For the purpose of extracting salts from the gases the vessel is partly filled with acid or acid solution. The salts crystallizing in the acid fall along the tapered sides of the lower side of the vessel to the bottom thereof and are continuously or intermittently removed by the ejector. The ammoniacal vapors entering the saturator vessel at the extension of the closed top of the vessel into an annular chamber 10, ending at a certain specific distance in the saturator bath 11, hereinafter described. The end of the pipe 12, has a serrated edge 13, for the purpose of splitting up the gas and the distance of this edge below the level of the bath maintained, as hereinafter explained, is dimensioned in accordance with the minimum pressure that the ammoniacal vapors attain when entering the bath. This vapor cracker pipe 12, is surrounded by another annular chamber 14, formed by the secondary shell 15. The gases liberated from the cracker pipe 12, emerge after dropping the salt, as waste gases or vapors from the bath inclosed by the secondary shell 15, and by draft induced by the stack rise in the secondary shell to the outlet 15$^a$. At the end of this outlet the vapors are baffled by the acid separator 16, interposed between the secondary shell and the pipe 17, leading to the stack. Particles of acid which may have been lifted by the suction of the stack along with the waste vapors are here intercepted and returned to the collecting pit, from whence they are returned to an annular seal referred to later on. The ascending waste gases run countercurrent to a spray of strong acid, which is fed through the perforated pipe 18, suspended from the top of the secondary shell. In this manner the gas receives a second washing and final extraction of the salts. As the temperature of the ammoniacal vapors ranges from about 180 to 210° F., the vapors passing through the acid bath will give off, beside the heat caused by the reaction of the acid, a certain amount of heat to the bath thus keeping the temperature of the bath inclosed by the secondary shell 15, at the desired temperature for the saturation of ammoniacal vapors. In ascending, the waste gases leaving the bath at about the temperature of the bath give off heat to the outside of the secondary shell for the reason that, as hereinafter described, the temperature inside the other shell surrounding the secondary shell is much lower, thus allowing an interchange of sensitive heat, otherwise going to waste.

The secondary shell 15, inclosing the high temperature vapor bath, projects a considerable distance below the bottom of the vapor cracker pipe 12, and also below the bottom of the gas cracker pipe referred to later on. This is done for the purpose of preventing rapid diffusion of the high temperature bath into the surrounding low temperature bath. The diffusion of heat from the high temperature bath to the surrounding low temperature bath is accomplished by the acid feed inside the secondary shell. The strength of the liquor required for saturation of a concentrated vapor such as introduced into the vapor cracker pipe 12, must naturally be greater, that is, it must contain a higher percentage of acid than is required in a liquor treating large volumes of gas, with a comparatively small amount of ammonia. Consequently the heavier liquor inside the secondary shell gravitates below the bottom of the shell and through the surging of the low temperature bath mingles and combines with this bath, giving off its heat to the low temperature bath, the heat radiation being due to the fact that the area of the low temperature bath is many times larger than is the area of the high temperature bath. It will be noted that the operating level of the bath in the hot zone is brought a considerable distance over the operating level of the low temperature bath. This high level is maintained inside of the secondary shell 15, by atmospheric balance. The balance is produced by the outlet of the secondary shell to the stack for the waste vapors and by the annular atmospheric seal pot 19, situated outside of the saturator shell and connected to the bath by a series of ports 20. By these means the liquid level inside of the pipe 12, resisting the pressure of but a few inches water column, is brought a considerable distance over the liquid level of the low temperature bath, and the heavy surge in the low temperature bath is broken and a comparatively constant level maintained in the secondary shell 15. For the better diffusion of the sensible heat in the high temperature bath to that of the low temperature, perforations (not shown) may be made in certain parts of the secondary shell communicating with the bath surrounding the same.

The gases of carbonization, after being cooled as referred to, and after having the tar and aqueous vapor condensed, are brought through the medium of a blower to the top of primary shell 21. By the compression in the blower the temperature of this gas is slightly raised, so that it will enter the saturator at about 100° F., taking into consideration the loss of heat by radiation in the mains between the blowers and saturator. Descending in the primary shell 21, the gas takes up heat from radiation through the secondary shell 15, deposited from the waste vapors previously referred to, which heat will keep the gas at a constant temperature. At the bottom of the primary shell the gases are conducted into the gas cracker pipe 22, for distribution in minute globules over the major part of the low temperature bath 23. Due to the pressure of the gas which enters the saturator at from 2½ to 5 pounds per square inch, the resultant pressure inside of the saturator shell and outside of the primary shell 21, depresses the surface level of the low temperature bath considerably, according to the pressure under which the apparatus is operated below the atmospheric level maintained in the secondary shell and the level in the annular seal 19. The salt deposited by the low temperature bath is removed together with the salt of the high temperature bath, as previously indicated, by ejector 24, and is lifted to a series of settling tanks which discharge the heavy salt to the usual centrifugal drier (not shown). The liquor decanted from the salt in the settling tanks, together with the liquor removed in the centrifugal drier, are returned through the over-flow or drain pipe 25, to the annular seal, from which the drained liquor again unites with the low temperature bath. Since, as previously referred to, the salt is ejected continuously, there is a more or less continuous stream of liquor returning through the annular seal. This liquor, having lost a considerable amount of heat by radiation and evaporation, has been further cooled down by the usual washing process of the centrifugal driers and therefore, when returned to the low temperature bath, will absorb the surplus heat coming from the secondary shell, previously referred to, and will in this manner prevent the overheating of the low temperature bath. The annular seal serves the several purposes already described besides that of counter-acting the radiation of heat from the low temperature bath. Even though the temperature of this returned liquor is lower than that of the bath, it is considerably higher than the temperature of the atmosphere. Thus it prevents the rapid radiation of the temperature on the periphery of the low temperature bath. Since the low temperature bath in operation is subject to fluctuations of pressure or surging called the wash, the annular seal is provided with an overflow 26, which serves the two-fold purpose of taking care of the surplus liquor and maintaining the maximum atmospheric pressure. This maximum must be regulated as described, to prevent pressure fluctuations by the bath on the ammoniacal vapors in the vapor cracker pipe 12. The minimum level brought about by this surge is counter-acted in the secondary shell by the suction previously referred to. For a proper distribution of the returned mother liquor over the entire surface of the low temperature bath, the annular seal is connected by a series of ports 20, which dip a certain distance into the bath to prevent the possible escape of gas. In order to keep the low temperature bath to the required degree of acidity, strong acid may be introduced through the medium of the annular seal. This, however, is optional.

I claim:

1. In a saturator, the combination of an inclosing shell, a concentric division wall, a vapor cracker pipe within said wall and a gas cracker pipe outside of said wall, and means for spraying acid into the upper portion of the space inclosed by said division wall, substantially as described.

2. In a saturator, the combination of an inclosing shell having a liquid seal on its periphery, means for separately supplying vapor and gas to different portions of the same acid bath, means for removing the formed salts, and means for returning to the liquid seal the liquor drained from the ejected salts, substantially as described.

3. In a saturator, the combination of a shell, three concentric tubes, open at the lower ends, arranged centrally in said shell and extending through the top of said shell and terminating above the bottom of the shell, the lower end of the inner tube terminating farthest away from and the lower end of the intermediate tube terminating nearest the bottom of the shell, the lower end of said inner tube provided with serrations, the lower end of the outer tube provided with a series of reversed wedge-like extensions having downwardly directed side walls, the edges thereof provided with serrations, the upper ends of the inner and outer tubes provided with pipe connections for outside sources of supply, the outer end of the intermediate tube provided with a pipe connection for withdrawal means, an outlet pipe connected to said shell and a seal about said shell, substantially as described.

FREDERICK TSCHUDY

Witnesses:
W. GRANT HARBISON,
M. M. HUGHES.

Copies of this patent may be obtained for five cents each, by addressing the "Commissioner of Patents, Washington, D. C."